United States Patent
Ohnishi et al.

(10) Patent No.: US 9,467,639 B2
(45) Date of Patent: Oct. 11, 2016

(54) VIDEO TRANSMISSION APPARATUS AND CONTROL METHOD FOR VIDEO TRANSMISSION APPARATUS

(71) Applicant: CANON KABUSHIKI KAISHA, Tokyo (JP)

(72) Inventors: Motoo Ohnishi, Kawasaki (JP); Katsutoshi Tajiri, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 13/779,664

(22) Filed: Feb. 27, 2013

(65) Prior Publication Data

US 2013/0170547 A1 Jul. 4, 2013

Related U.S. Application Data

(63) Continuation of application No. 12/549,280, filed on Aug. 27, 2009, now Pat. No. 8,411,755.

(30) Foreign Application Priority Data

Aug. 29, 2008 (JP) .................................. 2008-222020

(51) Int. Cl.
*H04N 7/12* (2006.01)
*H04N 5/38* (2006.01)
*H04N 21/236* (2011.01)
*H04N 21/238* (2011.01)
*H04N 21/845* (2011.01)

(52) U.S. Cl.
CPC .............. *H04N 5/38* (2013.01); *H04N 21/236* (2013.01); *H04N 21/238* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 6,031,574 A * | 2/2000 | Muller | ...................... | 375/240.12 |
| 7,706,384 B2 * | 4/2010 | van Beek | ................... | 370/395.4 |
| 7,876,829 B2 * | 1/2011 | Saito et al. | ............. | 375/240.16 |
| 8,811,478 B2 * | 8/2014 | Nakagawa | ........... | H04N 21/231 375/240.12 |
| 2004/0073936 A1* | 4/2004 | Kurauchi | ........................ | 725/90 |
| 2004/0218672 A1* | 11/2004 | Bourne et al. | ............ | 375/240.12 |
| 2005/0123058 A1* | 6/2005 | Greenbaum et al. | ..... | 375/240.28 |
| 2005/0249285 A1* | 11/2005 | Chen | ...................... | H04N 19/51 375/240.16 |
| 2006/0146934 A1* | 7/2006 | Caglar et al. | ............ | 375/240.12 |
| 2007/0071093 A1* | 3/2007 | Shi | ......................... | H04N 19/42 375/240.03 |
| 2008/0104648 A1* | 5/2008 | Chae et al. | .................... | 725/114 |
| 2008/0192738 A1* | 8/2008 | Florencio et al. | ............ | 370/389 |
| 2008/0259799 A1* | 10/2008 | van Beek | ............ | H04L 47/2416 370/235 |
| 2009/0174762 A1* | 7/2009 | Takahashi | .................. | 348/14.02 |
| 2012/0219073 A1* | 8/2012 | NepomucenoLeung et al. | ........................ | 375/240.27 |
| 2012/0294360 A1* | 11/2012 | Walker | ............. | H04N 21/23439 375/240.13 |

* cited by examiner

*Primary Examiner* — Phirin Sam
(74) *Attorney, Agent, or Firm* — Canon U.S.A. Inc., IP Division

(57) ABSTRACT

Waiting-for-transmission fragments that cannot be transmitted by a transmission unit due to the interruption of transmission by the transmission unit are stored. In accordance with the waiting-for-transmission fragments, a fragment to be transmitted prior to a first fragment including an intra-coded frame is eliminated from the waiting-for-transmission fragments. The transmission unit is controlled so that the first fragment is transmitted at the resumption of transmission.

27 Claims, 5 Drawing Sheets

FIG. 3

| FRAGMENT ID | POINTER | REFERENCE FRAME GENERATION TIME (IN UNITS OF MILLISECONDS) | TRANSMISSION FLAG (TRANSMITTED: 1, UNTRANSMITTED: 0) | REFERENCE FRAME FLAG |
|---|---|---|---|---|
| 1 | ****** | 0 | 1 | 1 |
| 2 | ****** | 0 | 1 | 0 |
| 3 | ****** | 0 | 0 | 0 |
| 4 | ****** | 1000 | 0 | 1 |
| 5 | ****** | 1000 | 0 | 0 |
| 6 | ****** | 1000 | 0 | 0 |
| 7 | ****** | 2000 | 0 | 1 |
| 8 | ****** | 2000 | 0 | 0 |
| 9 | ****** | 2000 | 0 | 0 |
| 10 | ****** | 3000 | 0 | 1 |
| 11 | ****** | 3000 | 0 | 0 |

VIDEO TRANSMISSION APPARATUS AND CONTROL METHOD FOR VIDEO TRANSMISSION APPARATUS

CROSS-REFERENCE TO RELATED APPLICATIONS

This application is a Continuation of U.S. patent application Ser. No. 12/549,280 filed Aug. 27, 2009, which claims priority from Japanese Patent Application No. 2008-222020 filed Aug. 29, 2008, the entire contents of all which are hereby incorporated by reference in their entireties.

BACKGROUND OF THE INVENTION

1. Field of the Invention

The present invention relates to a video transmission apparatus that transmits video data for each video frame group including one or more encoded video frames.

2. Description of the Related Art

For example, Japanese Patent Laid-Open No. 2005-086362 discloses a technique in which in a case where video transmission is delayed or interrupted due to network trouble or the like, a past video frame group that was not able to be transmitted is eliminated and the latest video frame group is transmitted so that delay can be reduced.

In a technique disclosed in Japanese Patent Laid-Open No. 2004-056819, in addition to a first encoding unit configured to generate inter-frame predictive coded first video data, a second encoding unit configured to generate intra-frame predictive coded second video data is provided. At the resumption of transmission, the second video data is transmitted as a complement to the first video data, and the second video data is decoded in advance. Consequently, even if transmission is resumed from a middle portion of a group of pictures (GOP), video data can be correctly decoded and played back.

However, in a system disclosed in Japanese Patent Laid-Open No. 2004-056819, a special function of receiving two types of video data and switching between them needs to be incorporated into a reception apparatus. Thus, it is difficult for the reception apparatus to play back video data by using a general playback process. In general, video data is played back using a media player such as QuickTime Player or Windows Media Player. Furthermore, it is necessary for a transmission apparatus to include a plurality of encoding units supporting different encoding methods. Thus, problems relating to complication of the hardware configuration and an increase in the load of software processing occur.

In the case of an MP4 file format, a movie fragment (hereinafter, referred to as a "fragment"), which is the unit of transmission, may be defined as in one of the following options:

(1) A group of video object planes (GOV) including video frames from a reference video frame that is encoded without inter-frame prediction to the video frame that is immediately before the next reference video frame, is defined as a fragment.

(2) Each of a plurality of sections obtained by dividing a GOV is defined as a fragment.

In the case of option (1), a fragment always starts from an I-frame (intra-coded frame: a video frame that has been encoded using only data within the frame). However, in the case of option (2), some fragments start from a video frame other than an I-frame, such as a P-frame (predicted frame: a video frame holding differential information on the immediately preceding video frame).

Thus, in a method for simply skipping to the latest fragment to resume transmission as in Japanese Patent Laid-Open No. 2005-086362, in a case where a fragment is defined as in option (2), decoding cannot be performed and an error occurs in a general playback method.

Even in such a case, when a reception apparatus includes a decoding unit having a special function of ignoring video frames in a fragment not including an I-frame up to the frame immediately before the next I-frame, video playback can be continued. However, general network media players do not include a decoding unit having such a special function. In addition, even if a reception apparatus independently includes a decoding unit having such a function, complicated processing is required, resulting in an increase in the processing load.

In addition, in a case where the length of a GOV is long (the number of frames is large), when transmission is resumed from the fragment starting from a P-frame that is immediately after a fragment starting from an I-frame, video is stopped for a long period of time until the next I-frame appears.

SUMMARY OF THE INVENTION

The present invention solves the above-described problems.

According to an aspect of the present invention, a transmission apparatus includes a transmission unit configured to transmit a fragment of one or more frames including an intra-coded frame and a fragment of one or more inter-coded frames; a storage unit configured to store waiting-for-transmission fragments that are not able to be transmitted by the transmission unit due to interruption of transmission by the transmission unit; an elimination unit configured to eliminate a fragment to be transmitted prior to a first fragment including an intra-coded frame from the waiting-for-transmission fragments, in accordance with the stored waiting-for-transmission fragments; and a control unit configured to control the transmission unit to transmit the first fragment at the resumption of transmission.

Further features of the present invention will become apparent from the following description of exemplary embodiments with reference to the attached drawings.

BRIEF DESCRIPTION OF THE DRAWINGS

FIG. 3 illustrates an example of fragment information stored in a waiting-for-transmission queue.

DESCRIPTION OF THE EMBODIMENTS

Embodiments of the present invention will be described with reference to the drawings.

In the following description, each of a plurality of sections obtained by dividing a GOV is defined as a fragment (frame group). A GOV represents a frame group of video frames from a video frame (I-frame) encoded without using inter-frame prediction to the video frame immediately before the next video frame (I-frame). An I-frame represents a video frame that has been encoded using data within the video frame without using data of the previous or next frame. In this embodiment, such an I-frame is referred to as a "reference frame". In addition, a P-frame is a video frame holding a difference from the previous video frame and is an example of a video frame encoded using data of other video frames. In this embodiment, instead of a P-frame, another type of video frame encoded using data of other video frames may be used.

Figure 1:
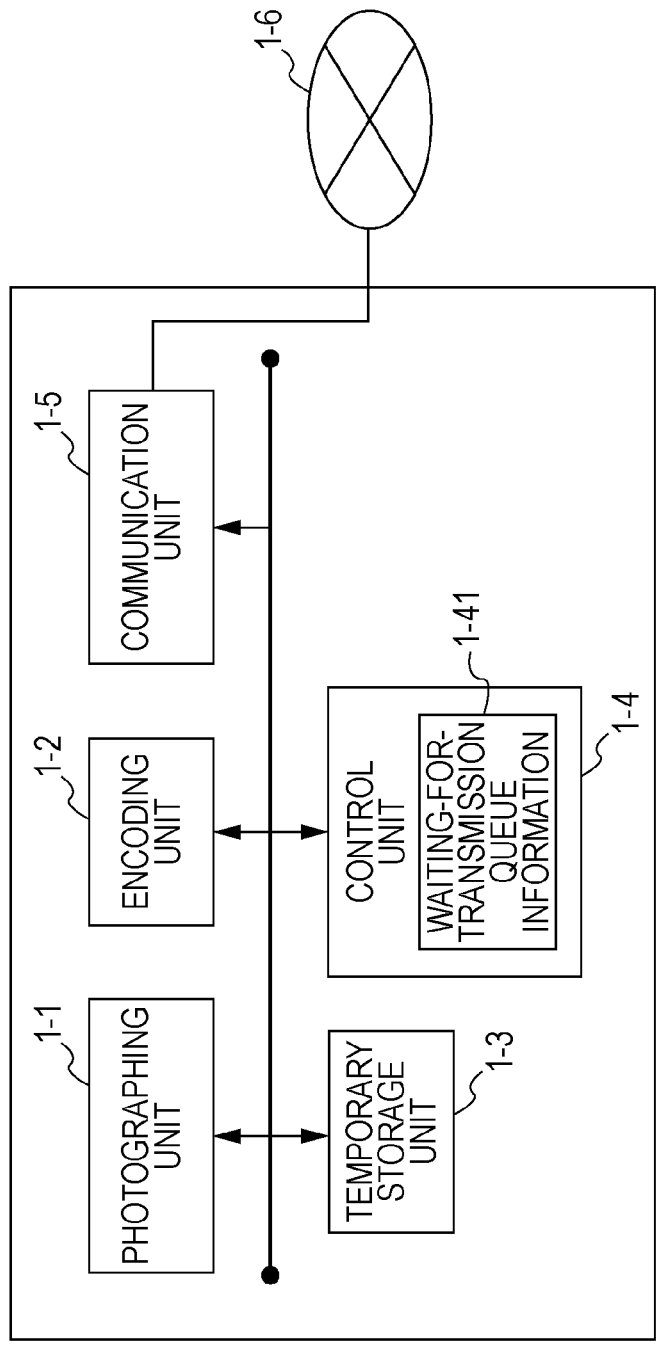
FIG. 1 is a block diagram of a video transmission apparatus according to an embodiment of the present invention.

FIG. 1 is a block diagram of a video transmission apparatus according to this embodiment.

The video transmission apparatus includes a photographing unit 1-1, an encoding unit 1-2, a temporary storage unit 1-3, a control unit 1-4, and a communication unit 1-5. The photographing unit 1-1 includes an image pickup element and generates video frames. The encoding unit 1-2 is an encoding circuit that performs inter-frame predictive encoding and intra-frame predictive encoding of the generated video frames. The temporary storage unit 1-3 includes a memory in which the encoded video frames are temporarily stored. The control unit 1-4 controls the entire video transmission apparatus. More specifically, the control unit 1-4 includes a computer-readable memory in which a program for causing a computer to perform processing of the control unit 1-4 is stored and a central processing unit (CPU) that performs the processing in accordance with the program. The communication unit 1-5 is a communication circuit that performs, via a network 1-6, transmission of encoded video frames and reception of a request from an external apparatus. The network 1-6 is, for example, the Internet.

The control unit 1-4 of the video transmission apparatus according to this embodiment stores waiting-for-transmission queue information 1-41 in a memory, and generates or eliminates a fragment by controlling information on the fragment in accordance with the waiting-for-transmission queue information 1-41.

Figure 2:
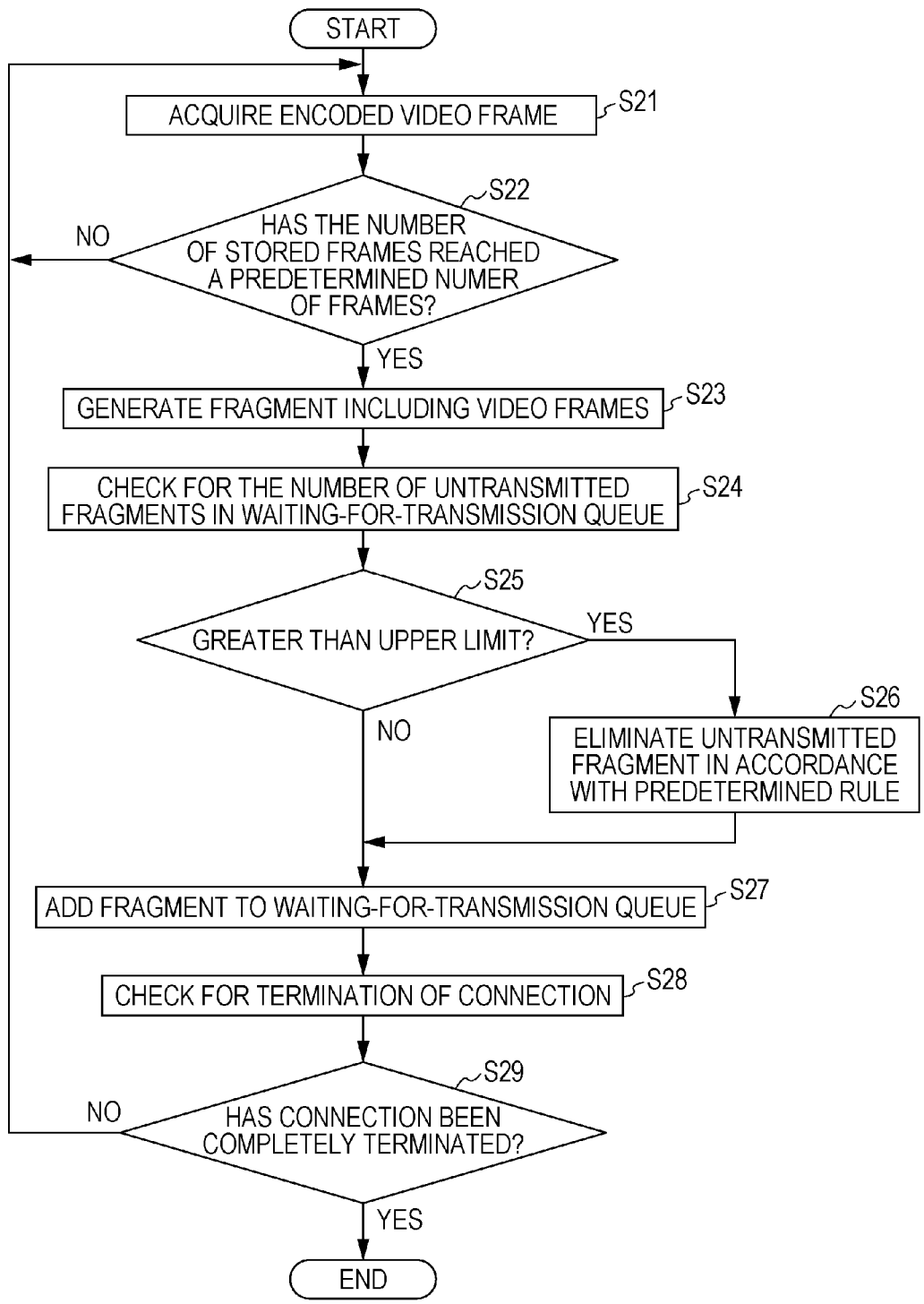
FIG. 2 is a flowchart showing a fragment generation process.

FIG. 2 is a flowchart of a fragment generation process performed by the control unit 1-4 of the video transmission apparatus.

In step S21, the communication unit 1-5 receives a video transmission request from an external apparatus via the network 1-6. In response to this request, the control unit 1-4 starts the fragment generation process. The control unit 1-4 causes the encoding unit 1-2 to encode video frames, and stores the encoded video frames in the temporary storage unit 1-3.

In step S22, the control unit 1-4 determines whether or not the number of video frames stored in the temporary storage unit 1-3 has reached a predetermined number of frames. In a case where the number of stored frames has not reached the predetermined number of frames (NO in step S22), the control unit 1-4 repeats the processing of step S21. Meanwhile, in a case where the number of stored frames has reached the predetermined number of frames (YES in step S22), the control unit 1-4 proceeds to step S23.

In a case where the number of stored video frames has reached the predetermined number of frames, the control unit 1-4 generates fragments into which the video frames are grouped in step S23.

In step S24, the control unit 1-4 holds the waiting-for-transmission queue information 1-41 on fragments so that information on waiting-for-transmission fragments (fragments to be transmitted) is controlled. Then, the control unit 1-4 sequentially transmits the stored fragments to the external apparatus from which the request has been received. After transmission has been completed, the control unit 1-4 deletes data of video frames of the transmitted fragments stored in the memory of the temporary storage unit 1-3. In addition, the control unit 1-4 checks the number of untransmitted fragments by referring to the waiting-for-transmission queue information 1-41.

In step S25, the control unit 1-4 checks whether or not the number of untransmitted fragments is greater than the upper limit. In a case where the number of untransmitted fragments is greater than the upper limit (YES in step S25), it can be considered that transmission is not being performed, for example, because the video transmission apparatus is in a transmission interruption state.

Thus, in a case where the number of untransmitted fragments is greater than the upper limit, the control unit 1-4 eliminates one or more fragments of the untransmitted fragments selected in accordance with a predetermined rule described later in step S26. That is, data of video frames of the selected one or more fragments is deleted from the memory of the temporary storage unit 1-3. Although in step S26 the processing is performed in accordance with the number of fragments, the processing may be performed in accordance with the number of video frames. The number of fragments may be replaced with another value as long as the value is associated with the fragment transmission state.

Meanwhile, in a case where the number of untransmitted fragments is not greater than the upper limit (NO in step S25) or elimination of the one or more untransmitted fragments in step S26 has been completed, the process proceeds to step S27. In step S27, the control unit 1-4 stores the fragments newly generated in step S23 in the temporary storage unit 1-3 and adds information on the newly generated fragments to the waiting-for-transmission queue information 1-41.

In step S28, in order to determine whether or not video transmission is to be continued, the control unit 1-4 checks for the termination of the connection with the external apparatus from which the request has been received.

In step S29, the control unit 1-4 determines whether or not the connection with the external apparatus has been completely terminated. In a case where it is determined that the connection with the external apparatus from which the request has been received is still active (NO in step S29), the process returns to step S21 to continue the fragment generation process. Meanwhile, in a case where it is determined that the connection with the external reception apparatus has been completely terminated (YES in step S29) and there is no need to continue transmission of a video frame, the fragment generation process is completed.

Figure 4:
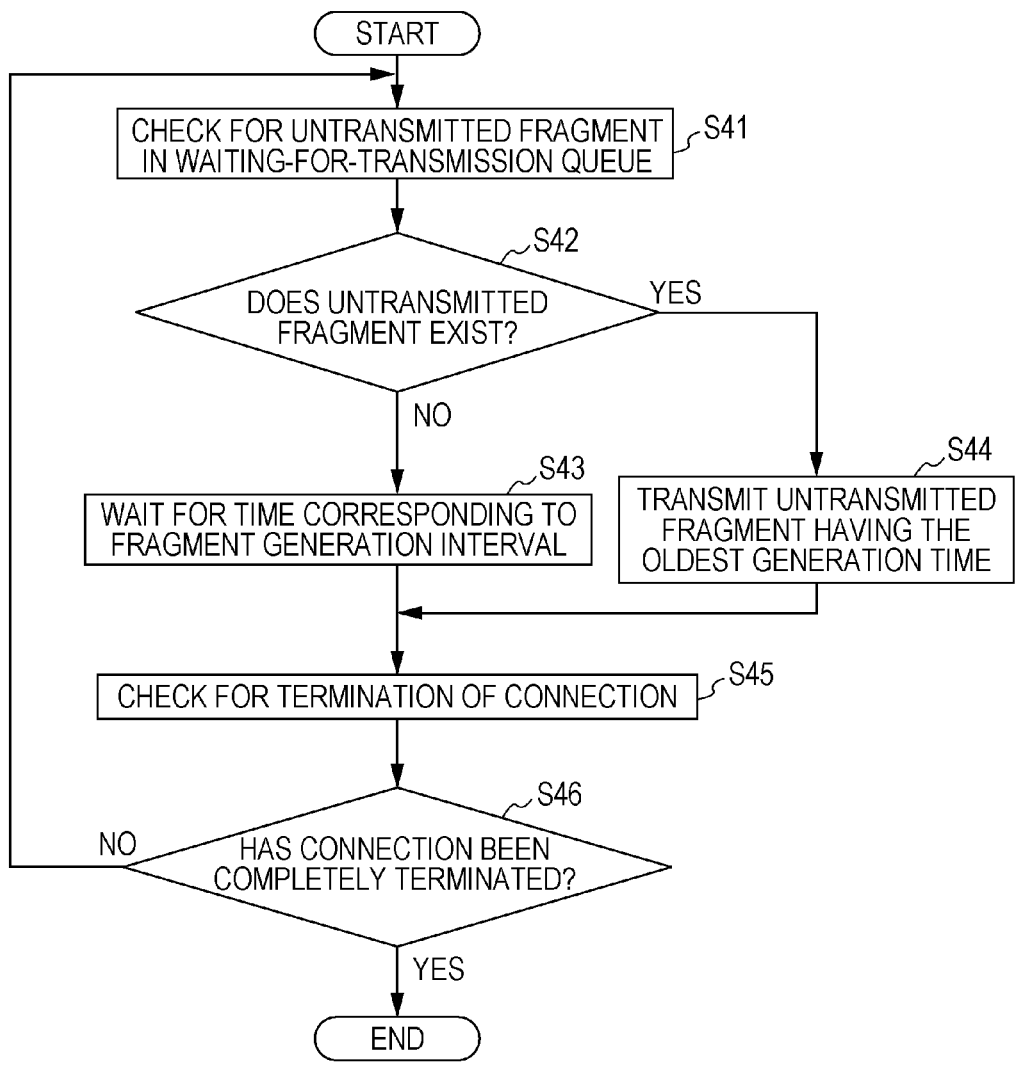
FIG. 4 is a flowchart showing a fragment transmission process.

The processing of step S21 is performed every interval at which the encoding unit 1-2 outputs a video frame. The processing of steps S22 to S28 does not depend on the communication state of a network. Thus, in a case where the same network communication state is continued and a state in which all the fragments cannot be transmitted is continued, elimination of one or more fragments in step S26 is regularly performed. Note that as shown in FIG. 4, a fragment transmission process is performed independent of the fragment generation process.

FIG. 3 shows a specific example of the waiting-for-transmission queue information 1-41.

The waiting-for-transmission queue information 1-41 regards the fragment ID, the pointer, the reference frame (I-frame) generation time, the transmission flag, and the presence or absence of the reference frame of each fragment.

The fragment ID represents the identification number of a fragment and is provided in accordance with the order in which fragments were generated. The pointer represents the position of the temporary storage unit 1-3 at which the entity of the fragment is stored. The reference frame generation time represents the time at which the initial reference frame (I-frame) of a GOV to which the fragment belongs is generated. The transmission flag represents whether or not the fragment has been transmitted. The reference frame flag represents whether the fragment includes a reference frame (I-frame). In a case where the fragment includes a reference frame, the reference frame flag indicates "1". Meanwhile, in a case where the fragment does not include a reference frame, the reference frame flag indicates "0". Such information is updated in such a manner that the current state is always reflected.

Note that such information is merely an example. All the information is not necessarily essential. For example, in a case where the waiting-for-transmission queue information includes only information on untransmitted fragments, a transmission flag is not necessary. Even in such a case, a GOV to which a fragment belongs can be determined in accordance with the reference frame generation time, and thus no problem occurs.

In the specific example of FIG. 3, a fragment is generated every 333 milliseconds, and a GOV is generated every 1000 milliseconds. Thus, a GOV includes three fragments. In addition, fragments whose IDs are "1", "4", "7", and "10" are defined as fragments starting from a reference frame (I-frame). Fragments whose IDs are "1" and "2" have already been transmitted, and transmission is interrupted immediately after the fragment whose ID is "2" is transmitted. Therefore, fragments whose IDs are "3" and larger values have not been transmitted.

In a case where the upper limit of the number of untransmitted fragments is set to nine, when a fragment whose ID is "12" is generated, the number of untransmitted fragments becomes ten, which is greater than the upper limit. In this case, in order to ensure the real-time property, one or more fragments are eliminated in step S26 of FIG. 2. In this embodiment, fragments including the oldest fragment to the fragment immediately before the most recently encoded reference frame (I-frame) among untransmitted fragments are eliminated. In the case of FIG. 3, fragments whose IDs are "3" to "9" are eliminated. Here, the control unit 1-4 can delete data of video frames of fragments having different reference frame generation times from the memory of temporary storage unit 1-3. In addition, the control unit 1-4 may detect a fragment including the newest reference frame by referring to a fragment ID and a reference frame flag. In this case, the control unit 1-4 deletes fragments including the oldest fragment to the fragment immediately before the detected fragment from the memory of the temporary storage unit 1-3. That is, since transmission of these fragments is restricted, the real-time property of video playback by an external apparatus can be ensured. In addition, since transmission of video frames is restricted in units of fragments, playback can be achieved with an external reception apparatus including a general playback function.

Note that by adjusting the upper limit (reference value) of the number of untransmitted fragments, the timing of elimination of one or more fragments in step S26 can be changed, and the priority between the video playback delay time and the video playback stop time in an external apparatus can be selected. For example, in a case where the upper limit of the number of untransmitted fragments is nine, at most nine generated fragments are played back prior to the fragment immediately after the interruption of transmission. Here, the maximum playback delay time is about three seconds (9×333 milliseconds). In a case where the upper limit is three, the maximum playback delay time is about one second (3×333 milliseconds). That is, compared with a case where the upper limit is nine, the maximum playback delay time is shortened by about two seconds. The upper limit can be changed by the control unit 1-4 in accordance with a request from an external apparatus to which video frames are transmitted.

However, the playback stop time and the playback delay time have a trade-off relationship. Therefore, in contrast, in a case where the upper limit of the number of untransmitted fragments is nine, compared with a case where the upper limit is three, the maximum playback stop time can be shortened by about two seconds. As described above, higher priority can be given to the playback delay time as the upper limit of the number of untransmitted fragments decreases. On the contrary, higher priority can be given to the playback stop time as the upper limit of the number of untransmitted fragments increases.

Furthermore, by adding a fragment that has not been generated to a waiting-for-transmission queue as a transmitted fragment, the playback delay time can be further shortened. More specifically, at a time when a fragment whose ID is "11" in FIG. 3 is generated, the fragments whose IDs are "3" to "11" are eliminated. At the same time, a fragment that has not been generated and that is before the fragment whose ID is "13", that is, a fragment whose ID is "12", is added to a waiting-for-transmission queue in a state where the transmission flag indicates "1". Even when the fragment whose ID is "12" is generated, the fragment whose ID is "12" is not transmitted, as long as the transmission flag indicating "1" is registered in the waiting-for-transmission queue. Here, the fragment whose ID is "12" needs to be eliminated. Thus, playback is resumed not only from a fragment 107 starting from the I-frame that is generated immediately before time $T_2$ in FIG. 5, but also from a fragment 110 starting from an I-frame generated immediately after time $T_2$.

FIG. 4 is a flowchart of a fragment transmission process performed by the control unit 1-4 of the video transmission apparatus.

As in the fragment generation process shown in FIG. 2, the fragment transmission process starts in response to a video transmission request received from an external apparatus via the network 1-6.

In step S41, the control unit 1-4 checks for an untransmitted fragment in a waiting-for-transmission queue. In step S42, the control unit 1-4 determines whether or not an untransmitted fragment exists in the waiting-for-transmission queue. In a case where it is determined in step S42 that no untransmitted fragment exists (NO in step S42), the process proceeds to step S43. In step S43, the control unit 1-4 waits for a time corresponding to a fragment generation interval. Meanwhile, in a case where it is determined in step S42 that an untransmitted fragment exists (YES in step S42), the process proceeds to step S44.

In step S44, the control unit 1-4 causes the communication unit 1-5 to transmit the fragment whose generation time is the oldest among untransmitted fragments included in the waiting-for-transmission queue. The determination of which fragment is the oldest can be made by a determination of which fragment ID is the smallest.

In step S45, in order to determine whether or not video transmission is to be continued, the control unit 1-4 checks for the termination of the connection with the external apparatus from which the request has been received.

In step S46, the control unit 1-4 determines whether or not the connection with the external apparatus has been completely terminated. In a case where it is determined in step S46 that the connection with the external apparatus from which the request has been received is still active (NO in step S46), the process returns to step S41 to continue the transmission process. Meanwhile, in a case where it is determined in step S46 that the connection with the external apparatus has been completely terminated (YES in step S46), the control unit 1-4 completes the fragment transmission process.

Depending on the communication status, transmission of a fragment in step S44 might not be able to be immediately performed. Thus, the processing of step S41 may be performed at a long interval. However, the fragment transmission process is performed independently of the fragment generation process shown in FIG. 2, and elimination of one or more fragments in step S26 is regularly performed at a fragment generation interval. Hence, even in case where the processing of step S41 is performed at a longer interval due to the communication status, video transmission can be skipped without any problems.

Figure 5:
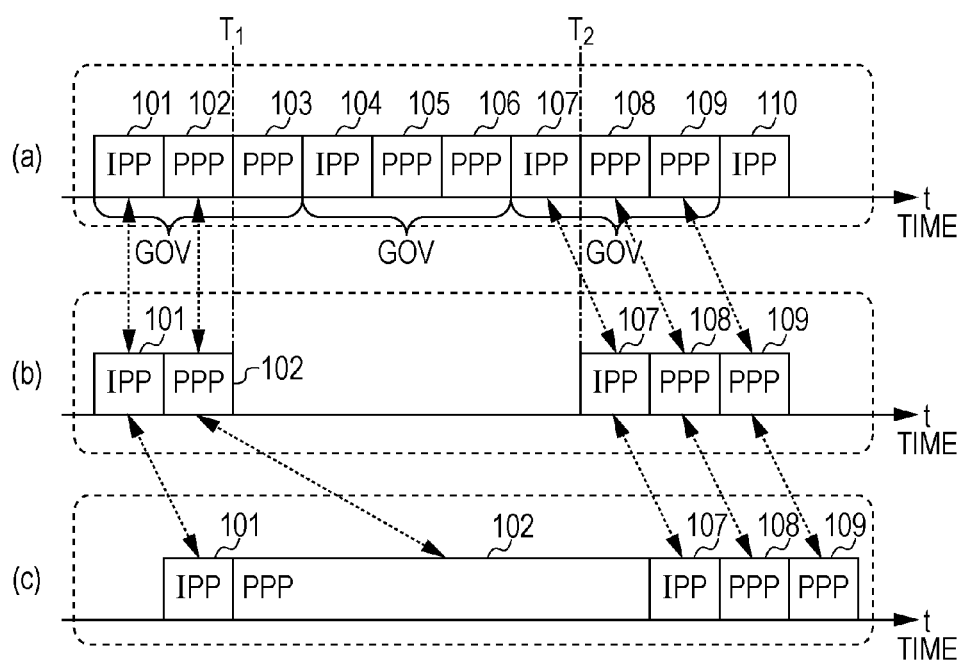
FIG. 5 illustrates fragments transmitted from a video transmission apparatus and fragments played back by an external apparatus.

FIG. 5 is an illustration showing, in a time-series manner, the relationship between fragments transmitted from the video transmission apparatus and received by an external apparatus before and after interruption of video transmission.

Part (a) of FIG. 5 shows fragments stored in the temporary storage unit 1-3. Part (b) of FIG. 5 shows fragments actually transmitted from the communication unit 1-5. Part (c) of FIG. 5 shows fragments received by the external apparatus. The abscissa axis of parts (a) to (c) of FIG. 5 represents a time axis.

Fragments 101 to 110 are fragments each constituted by three video frames. The fragments 101 to 103 constitute a GOV, the fragments 104 to 106 constitute a GOV, and the fragments 107 to 109 constitute a GOV. The initial fragments 101, 104, 107, and 110 of the individual GOVs are fragments each including a reference frame (I-frame), and the other fragments include P-frames. The fragments in parts (a) to (c) of FIG. 5 connected with double-sided broken-line arrows show the same fragment. In FIG. 5, the time required for generation and transmission of each fragment in the video transmission apparatus is assumed as zero, for simplification.

For example, in a case where no fragment can be transmitted temporarily during a period from time $T_1$ to time $T_2$ due to the occurrence of some network trouble, the video transmission apparatus according to this embodiment resumes transmission from the fragment 107, which includes the I-frame generated before time $T_2$ and is the initial fragment of the GOV to which the fragment 108 that was first generated after time $T_2$ belongs. That is, the fragments 103 to 106 are deleted.

In the video transmission apparatus according to this embodiment, the fragment 103, which was generated after time $T_1$, may be first transmitted after time $T_2$. This is because the fragments 101 and 102 of the GOV to which the fragment 103 belongs have been received by the external apparatus. In this case, the external apparatus needs to store the fragments 101 and 102 until the fragment 103 is received. Here, in the processing for eliminating one or more fragments in step S26 of FIG. 2, the control unit 1-4 stores a fragment generated before the oldest fragment including a reference frame in the memory of the temporary storage unit 1-3, without eliminating the fragment. That is, the fragments 104 to 106 are deleted.

Namely, in the video transmission apparatus according to this embodiment, as shown in FIG. 5, video frames of the fragments 103 (104) to 106 are deleted and are thus not played back. However, since a fragment to be transmitted immediately after interruption includes all the video frames necessary for playback, the fragment can be played back by an external apparatus without any problems. That is, even in a case where an external apparatus includes only a general-purpose network media player, interruption of transmission in units of fragments can be handled. Thus, the number of deleted video frames can be reduced while playback delay is reduced.

In normal playback processing in an external apparatus, in a case where transmission of a fragment is interrupted, the last video frame of the fragment 102 that was transmitted immediately before the transmission interruption is continued to be displayed, as shown in part (c) of FIG. 5. Then, after the resumption of transmission of a fragment, playback of video frames of the fragments 103 to 106 is skipped, and playback starts from video frames of the fragment 107. In addition, in a case where the fragments 104 to 106 are deleted, after the resumption of transmission, video frames of the fragment 103 are played back. After that, video frames of the fragment 107 are played back.

As described above, in a case where the number of frames included in a fragment is smaller than the number of frames included in a GOV and a reception apparatus does not include a decoding unit having a special function, video playback can be continued while the real-time property is maintained.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A transmission apparatus for transmitting coded data including intra-coded frame data and inter-coded frame data, comprising:
   a monitoring unit configured to monitor a transmission state of the coded data; and
   a transmission unit configured to transmit the coded data, to omit to transmit the inter-coded frame data before the intra-coded frame data when a transmission trouble occurs, and to transmit the coded data from the intra-coded frame data without transmitting the inter-coded frame data before the intra-coded frame data.

2. The transmission apparatus according to claim 1, wherein the transmission unit transmits untransmitted inter-coded frame data to be decoded in accordance with intra-coded frame data transmitted before the transmission trouble occurs.

3. A transmission apparatus for transmitting coded data including intra-coded frame data and inter-coded frame data, comprising:
   a storage unit configured to store coded data; and
   a transmission unit configured to transmit the coded data stored in the storage unit, to omit to transmit the inter-coded frame data before the intra-coded frame data stored in the storage unit when a transmission trouble occurs, and to transmit the coded data from the intra-coded frame data stored in the storage unit when the transmission trouble occurs without transmitting the inter-coded frame data before the intra-coded frame data.

4. The transmission apparatus according to claim 1, wherein the transmission unit transmits the coded data read out from a storage unit, and further comprising a control unit configured to discard the inter-coded frame data from the storage unit in a unit of a fragment when the transmission trouble occurs.

5. The transmission apparatus according to claim 1, wherein the transmission unit transmits the coded data from the latest intra-coded frame data stored in a storage unit.

6. A transmission method performed by a transmission apparatus for transmitting coded data including intra-coded frame data and inter-coded frame data, the method comprising:
   omitting to transmit the inter-coded frame data before the intra-coded frame data when a transmission trouble occurs; and
   transmitting the coded data from the intra-coded frame data without transmitting the inter-coded frame data before the intra-coded frame data.

7. The transmission method according to claim 6, wherein the transmitting step transmits untransmitted inter-coded frame data to be decoded in accordance with intra-coded frame data transmitted before the transmission trouble occurs.

8. A transmission method performed by a transmission apparatus for transmitting coded data including intra-coded frame data and inter-coded frame data, the method comprising:
   storing coded data in a storage unit;
   transmitting the coded data stored in the storage unit;
   omitting to transmit the inter-coded frame data before the intra-coded frame data stored in the storage unit when a transmission trouble occurs; and
   transmitting the coded data from the intra-coded frame data stored in the storage unit when the transmission trouble occurs without transmitting the inter-coded frame data before the intra-coded frame data.

9. The transmission method according to claim 6, wherein the coded data read out from a storage unit is transmitted, and further comprising a discarding step of discarding the inter-coded frame data from the storage unit in a unit of a fragment when the transmission trouble occurs.

10. The transmission method according to claim 6, wherein the transmitting step transmits the coded data from the latest intra-coded frame data stored in a storage unit.

11. A non-transitory computer-readable storage medium storing a computer-executable process for transmitting coded data including intra-coded frame data and inter-coded frame data, comprising:
   omitting to transmit the inter-coded frame data before the intra-coded frame data when a transmission trouble occurs; and
   transmitting the coded data from the intra-coded frame data without transmitting the inter-coded frame data before the intra-coded frame data.

12. The non-transitory storage medium according to claim 11,
   wherein the transmitting step transmits untransmitted inter-coded frame data to be decoded in accordance with intra-coded frame data transmitted before the transmission trouble occurs.

13. A non-transitory computer-readable storage medium storing a computer-executable process for transmitting coded data including intra-coded frame data and inter-coded frame data, comprising:
   storing coded data in a storage unit;
   transmitting the coded data stored in the storage unit;
   omitting to transmit the inter-coded frame data before the intra-coded frame data stored in the storage unit when a transmission trouble occurs; and
   transmitting the coded data from the intra-coded frame data stored in the storage unit when the transmission trouble occurs without transmitting the inter-coded frame data before the intra-coded frame data.

14. The non-transitory storage medium according to claim 11, wherein the coded data read out from a storage unit is transmitted, and further comprising a discarding step of discarding the inter-coded frame data from the storage unit in a unit of a fragment when the transmission trouble occurs.

15. The non-transitory storage medium according to claim 11, wherein the transmitting step transmits the coded data from the latest intra-coded frame data stored in a storage unit.

16. The transmission apparatus according to claim 1, wherein the transmission unit interrupts transmission of the coded data in accordance with a network trouble, and resumes the interrupted transmission of the coded data from the intra-coded frame data without transmitting the inter-coded frame data before the intra-coded frame data.

17. The transmission method according to claim 6, wherein the omitting step interrupts transmission of the coded data in accordance with a network trouble, and the transmitting step resumes the interrupted transmission of the coded data from the intra-coded frame data without transmitting the inter-coded frame data before the intra-coded frame data.

18. The storage medium according to claim 11, wherein the omitting step interrupts transmission of the coded data in accordance with a network trouble, and the transmitting step resumes the interrupted transmission of the coded data from the intra-coded frame data without transmitting the inter-coded frame data before the intra-coded frame data.

19. The transmission apparatus according to claim 1, wherein the transmission unit omits to transmit the inter-coded frame data in a case where a predetermined number of frames of coded data have not been transmitted by the transmission unit.

20. The transmission apparatus according to claim 3, wherein the transmission unit transmits the coded data from the latest intra-coded frame data stored in the storage unit.

21. The transmission method according to claim 6, wherein the omitting step omits to transmit the inter-coded frame data in a case where a predetermined number of frames of coded data have not been transmitted.

22. The transmission method according to claim 8, wherein the transmitting step transmits the coded data from the latest intra-coded frame data stored in the storage unit.

23. The non-transitory storage medium according to claim 11, wherein the omitting step omits to transmit the inter-coded frame data in a case where a predetermined number of frames of coded data have not been transmitted.

24. The non-transitory storage medium according to claim 13, wherein the transmitting step transmits the coded data from the latest intra-coded frame data stored in the storage unit.

25. The transmission apparatus according to claim 3, wherein the transmission unit transmits untransmitted inter-coded frame data to be decoded in accordance with intra-coded frame data transmitted before the transmission trouble occurs.

26. The transmission method according to claim 8, wherein the transmission step transmits untransmitted inter-coded frame data to be decoded in accordance with intra-coded frame data transmitted before the transmission trouble occurs.

27. The non-transitory storage medium according to claim 13, wherein the transmission step transmits untransmitted inter-coded frame data to be decoded in accordance with intra-coded frame data transmitted before the transmission trouble occurs.

* * * * *